UNITED STATES PATENT OFFICE.

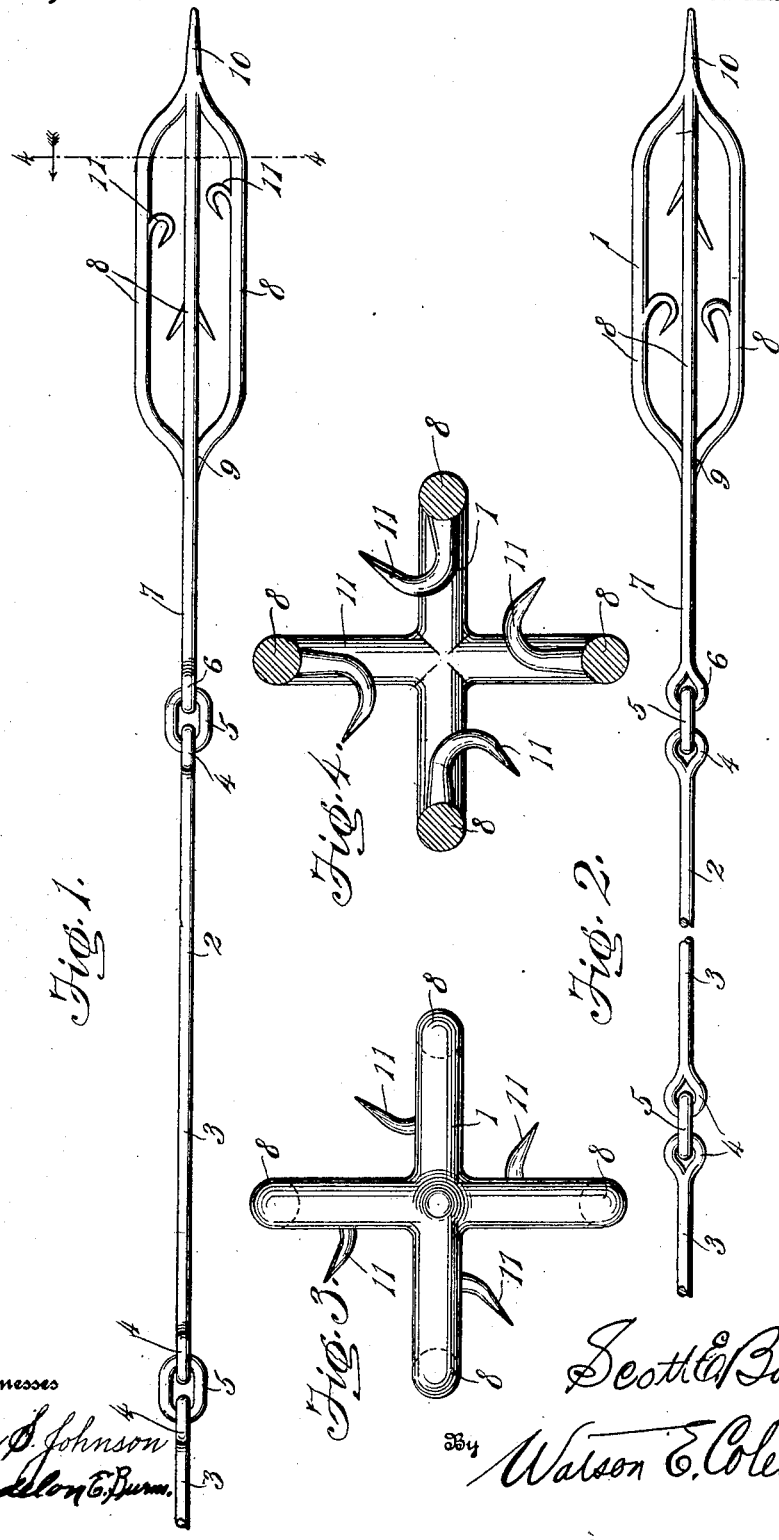
S. E. BARWIS.
SEWER PIPE CLEANER.
APPLICATION FILED NOV. 30, 1908.
916,654.
Patented Mar. 30, 1909.

SCOTT E. BARWIS, OF ALTOONA, PENNSYLVANIA.

SEWER-PIPE CLEANER.

No. 916,654.  Specification of Letters Patent.  Patented March 30, 1909.

Application filed November 30, 1908. Serial No. 465,186.

*To all whom it may concern:*

Be it known that I, SCOTT E. BARWIS, a citizen of the United States, residing at Altoona, in the county of Blair and State of Pennsylvania, have invented certain new and useful Improvements in Sewer-Pipe Cleaners, of which the following is a specification, reference being had to the accompanying drawings.

This invention relates to improvements in devices for cleaning sewers, waste pipes and the like.

The object of the invention is to provide a simple and practical device of this character in the form of a flexible or jointed plunger rod and grapple which may be readily forced through a sewer or waste pipe line of straight, curved or other shape to loosen and remove the dirt or any obstructions therein.

With the above and other objects in view, the invention consists of the novel features of construction and the combination and arrangement of parts hereinafter fully described and claimed, and illustrated in the accompanying drawings, in which—

Figure 1 is a plan view of the device; Fig. 2 is a side elevation; Fig. 3 is an end view; and Fig. 4 is a cross section taken on the plane indicated by the line 4—4 in Fig 1.

The invention comprises a head 1 adapted to serve both as a plunger and a grapple and a flexible body 2. The latter may be of any suitable form and construction and of any length, but it is preferably composed of a plurality of long links or rods 3 formed at their ends with eyes 4 and united by short links or loops 5. One of the links 5 unites the outermost link 2 to an eye 6 on the inner end 7 of the member or head 1 which end 7 is in the form of a straight rod or shank projecting from the enlarged outer portion or head proper of said member 1. This head is preferably in the form of an open cage of slightly less cross sectional diameter or area than the pipe through which it is to be forced; and as illustrated it is composed of four equidistantly spaced longitudinally extending bars or rods 8 the rear extremities of which are brought together and united at 9 to the parts 7 and the forward extremities of which are brought together and united to provide a point or nose 10 which may be readily forced through a mass of dirt or any other obstruction in a sewer pipe or the like. This open or cage-like head, it will be seen, serves as a plunger and in order to permit it to serve as a grapple to effectively retain the dirt within it and draw the same out of the sewer pipe when the device is removed, inwardly, laterally and rearwardly turned hooks 11 are formed at one or more points on one or more of the bars 8. When the head 1 is forced through the dirt in the pipe the dirt will fall within said head or between the rods or bars 8 and when the device is drawn out of the pipe the hooks 11 will engage and retain the dirt in the head. Owing to the construction of the flexible body 2, it will be seen that when the latter is rotated, the plunger and grapple head 1 will rotate with it, thereby rendering the device more effective in loosening the dirt. The preferred arrangement of the hooks 11 is illustrated, the same consisting of one hook arranged on each of the bars 8, the hooks on opposing bars being disposed adjacent opposite ends of the bars, and all of the hooks being bent laterally from the longitudinal, as illustrated.

Having thus described the invention what is claimed is:

1. A device of the character described comprising a body composed of long links having eyes at their ends and short links engaged with the eyes of adjacent long links, whereby the latter are flexibly connected to permit them to swing to any angle with respect to each other and thereby enable the flexible body to be forced longitudinally through an irregular-shaped pipe, and a cage-like plunger flexibly connected to the front end of the body and having a pointed front end or nose, whereby it may be forced through dirt in a sewer pipe or the like, said plunger also having means for retaining the dirt within it, whereby the dirt may be drawn out of the pipe with said plunger.

2. A device of the character described comprising a flexible body composed of loosely connected rigid links, whereby the body may be forced longitudinally through an irregular-shaped pipe by pushing it therethrough from its rear end, a plunger comprising a plurality of spaced longitudinally extending rods having their forward ends brought together and united to provide a single centrally arranged, longitudinally projecting, pointed nose adapted to be forced through dirt in a sewer pipe or the like, the rear ends of said rods being brought together and united to form a single rod having a loose flexible connection with the front end of said body, and inwardly and laterally turned grapple hooks projecting from the inner faces of said rods to retain dirt within the plunger and permit it to be drawn out of the pipe together with the plunger.

In testimony whereof I hereunto affix my signature in the presence of two witnesses.

SCOTT E. BARWIS.

Witnesses:
J. C. DURNON,
T. L. VAUGHN.